Patented Dec. 25, 1928.

1,696,769

UNITED STATES PATENT OFFICE.

HANS JORDAN, OF BERLIN-STEGLITZ, GERMANY, ASSIGNOR TO THE FIRM: CHEMISCHE FABRIK AUF ACTIEN, VORM. E. SCHERING, OF BERLIN, GERMANY.

METHOD OF PRODUCING CONDENSATION PRODUCTS FROM CRUDE CRESOL AND ACETONE.

No Drawing. Application filed October 25, 1927, Serial No. 228,701, and in Germany October 26, 1926.

My invention refers to the production of condensation products from crude cresol and acetone. As explained in my copending application for patent of the United States, filed June 20, 1927, Serial No. 200,289, condensation of p- or m-cresol with ketones, and more especially with acetone in the presence of a condensing agent of acid character at a temperature not exceeding 100° C. results in products representing a di-mer form of the alkylene cresols first formed and which are valuable in the production of odorants and disinfectants. If a mixture of m- and p-cresol is used there results a mixture of m- and p-products, which cannot easily be separated.

I have now found that the two condensation products present in this mixture can be separated from each other in a simple manner, if the mixture is dissolved in ether. From this solution are separated out beautiful crystals which consist of the pure m-cresol acetone product containing crystal ether and melt at 73-75° C., the ether being split off. In the mother liquor the p-cresol acetone product remains over. The condensation products obtained according to this invention are believed to have the following formulas:

The product obtained from m-cresol and acetone:

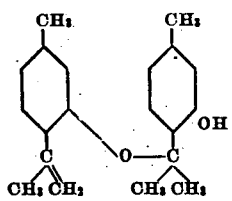

This product crystallizes with 1 molecule of crystal ether.

The product obtained from p-cresol and acetone:

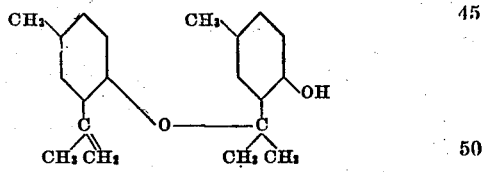

Various changes may be made in the details disclosed in the foregoing specifications without departing from the invention or sacrificing the advantages thereof.

I claim:—

The method of recovering separately the constituents from a mixture of the products obtained by condensation of crude cresol and acetone, comprising dissolving the product in ether and separating the m-cresol acetone condensation product which has crystallized out.

In testimony whereof I affix my signature.

HANS JORDAN.